US009409460B2

(12) United States Patent
Viglione et al.

(10) Patent No.: US 9,409,460 B2
(45) Date of Patent: Aug. 9, 2016

(54) CAB AIR FILTRATION SYSTEM FOR AGRICULTURAL MACHINES

(71) Applicant: DENSO Thermal Systems S.p.A., Poirino (Torino) (IT)

(72) Inventors: Michele Viglione, Poirino (IT); Piero Scarrone, Poirino (IT)

(73) Assignee: Denso Thermal Systems S.P.A., Poirino (Turin) (IT)

( * ) Notice: Subject to any disclaimer, the term of this patent is extended or adjusted under 35 U.S.C. 154(b) by 115 days.

(21) Appl. No.: 14/285,377

(22) Filed: May 22, 2014

(65) Prior Publication Data

US 2014/0345467 A1    Nov. 27, 2014

(30) Foreign Application Priority Data

May 24, 2013    (IT) .............................. TO2013A0418

(51) Int. Cl.
*B60H 1/00*    (2006.01)
*B60H 3/06*    (2006.01)

(52) U.S. Cl.
CPC .............. *B60H 1/00378* (2013.01); *B60H 3/06* (2013.01); *B60H 3/0625* (2013.01)

(58) Field of Classification Search
CPC ............. B60H 1/00378; B60H 3/0608; B60H 1/3428; B60H 1/00792; B60H 1/00328
USPC ............. 55/385.1, 385.3; 165/42, 58; 454/70, 454/124, 139, 158
See application file for complete search history.

(56) References Cited

U.S. PATENT DOCUMENTS

| 3,670,808 | A | * | 6/1972 | Wait, Jr. | B60H 1/00378 165/42 |
| 4,581,988 | A | * | 4/1986 | Mattei | B60H 1/00378 454/70 |
| 4,784,048 | A | * | 11/1988 | Nelson | B60H 3/0608 454/158 |
| 5,643,080 | A | * | 7/1997 | Kondoh | B60H 1/3428 454/124 |
| 5,868,312 | A | * | 2/1999 | Feldt | B60H 1/00792 236/49.3 |
| 6,620,039 | B1 | * | 9/2003 | Tao | B60H 1/00378 454/139 |
| 2014/0262143 | A1 | * | 9/2014 | Koch | B60H 1/00328 165/58 |

FOREIGN PATENT DOCUMENTS

| DE | 3642443 | 6/1988 |
| DE | 3940363 | 6/1991 |
| DE | 19651669 C1 | 12/1997 |
| EP | 2253494 | 11/2010 |

OTHER PUBLICATIONS

Italian Search Report and Written Opinion for Application No. TO2013A000418 dated Feb. 18, 2014.

* cited by examiner

*Primary Examiner* — Duane Smith
*Assistant Examiner* — Minh-Chau Pham
(74) *Attorney, Agent, or Firm* — Patterson & Sheridan, LLP

(57) ABSTRACT

A cab air treatment apparatus for an agricultural machine includes an external air inlet, a filtration system, an air conditioning system, and a cab air supply outlet. The filtration system includes, in order: a first filter, a second filter, upstream of which is arranged a bypass valve for selectively putting the adsorption filter, or a bypass branch arranged in parallel with the second filter, in communication with the system, a blower for providing a desired pressurization downstream of the cab air supply outlet, and a deflecting valve having a main outlet connected to the air conditioning system, and a discharge outlet for cleaning the filtration system, said outlets being operable alternatively to one another.

3 Claims, 4 Drawing Sheets

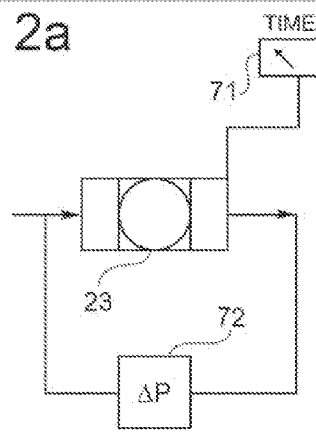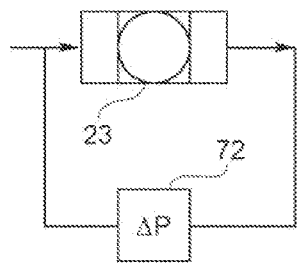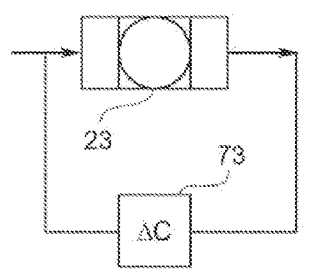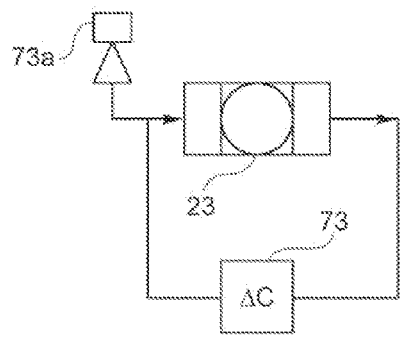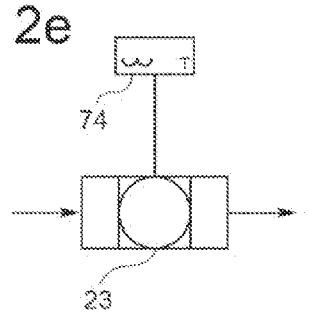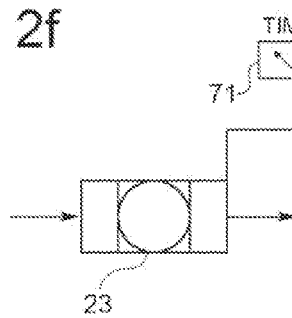

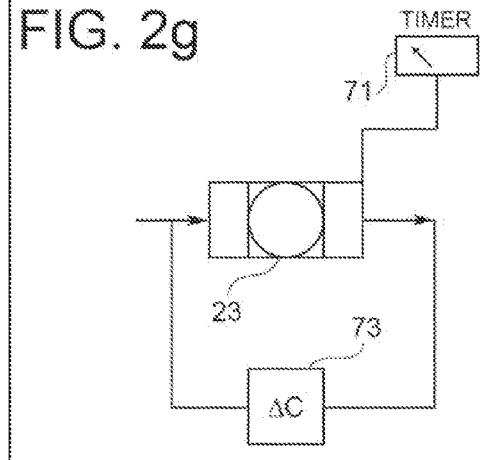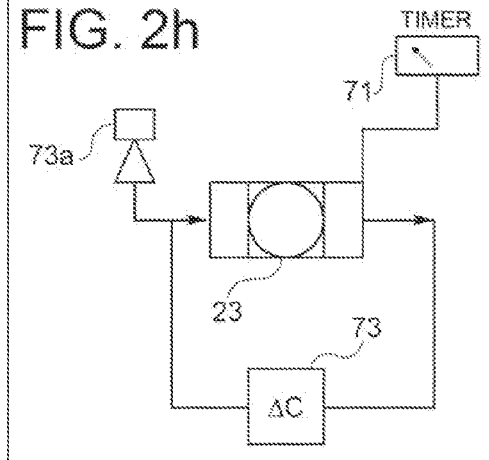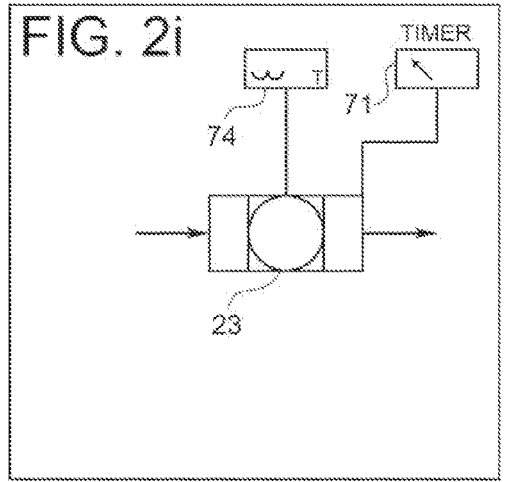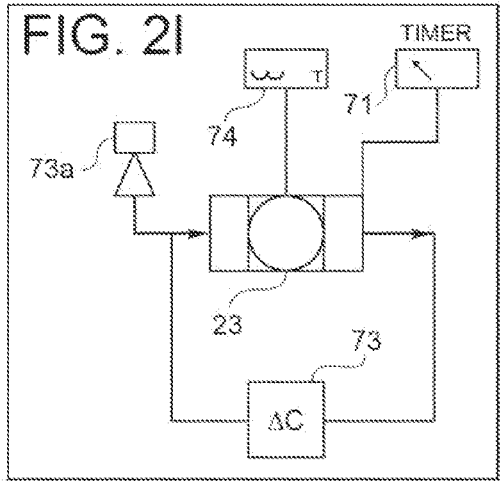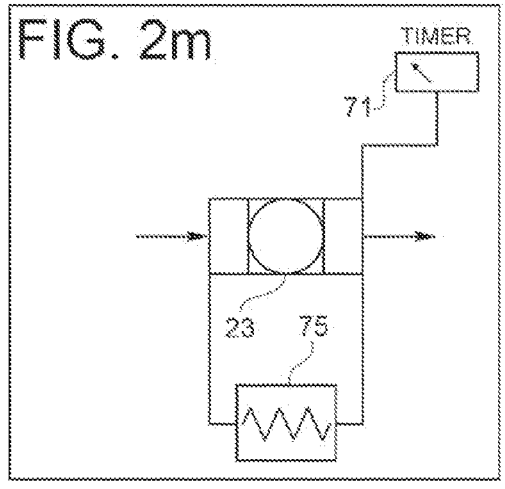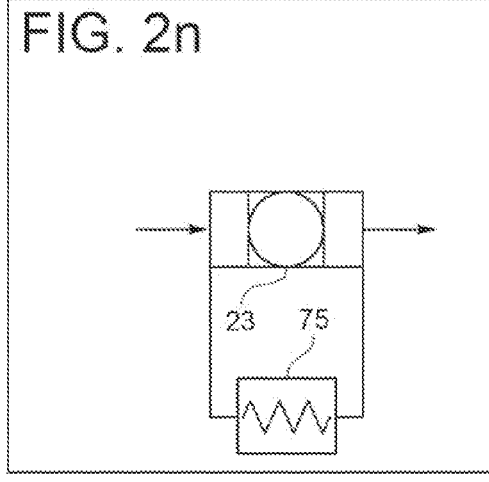

CAB AIR FILTRATION SYSTEM FOR AGRICULTURAL MACHINES

BACKGROUND OF THE INVENTION

1. Field of the Invention

The present invention relates to a cab air treatment apparatus for an agricultural machine, comprising an external air inlet, a filtration system connected downstream of the external air inlet, an air conditioning system connected downstream of the filtration system, and a cab air supply outlet connected downstream of the air conditioning system.

2. Description of the Related Art

Conventional types of air treatment apparatus for agricultural machines provide dust filtration, but aerosols and vapours can, in practice, still flow freely into the vehicle cab. Furthermore, these known apparatus are inflexible, and it is difficult to use them to achieve satisfactory levels of pressurization in the cab, in particular if the latest standards are borne in mind.

SUMMARY OF THE INVENTION

The invention therefore proposes an apparatus of the type defined at the outset, in which the filtration system comprises, in order:

a first filter for providing mechanical filtration of dust,
a second filter for providing filtration of at least one among dust, aerosols and vapours, upstream of which a bypass valve is arranged for selectively putting the second filter, or a bypass branch arranged in parallel with the second filter, in communication with the system,
a blower for providing desired pressurization downstream of the cab air supply outlet, and
a deflecting valve having a main outlet connected to the air conditioning system, and a discharge outlet for cleaning the filtration system, said outlets being operable alternatively to one another.

According to the invention, therefore, two different filters, with different functions, are provided. The possibility of bypassing the second filter enables this filter to be used only when really necessary, thus preserving the useful life and efficiency of the filter, while the first filter has the function of removing the coarser pollutants (dust and materials of larger size). Moreover, even if the second filter is missing because it is undergoing maintenance or replacement or selection by the operator, the apparatus can still be used.

It is also possible to pressurize the vehicle cab by using the blower of the filtration system, without the need to use the blower or blowers of the air conditioning system. In fact, in the system according to the invention the filtration system is decoupled from the air conditioning system. An electronic control system controls the various components of the apparatus, to provide the highest level of safety, flexibility and precision in the monitoring and control of these components.

Preferred embodiments of the invention are defined in the dependent claims, which are to be considered as an integral part of the present description.

BRIEF DESCRIPTION OF THE DRAWINGS

Further characteristics and advantages of the apparatus according to the invention will be made clearer by the following detailed description of an embodiment of the invention, given with reference to the attached drawings which are provided purely as non-limiting illustrations, in which:

FIGS. 2a to 2i and 2l to 2n show different strategies for monitoring a filter of the apparatus of FIG. 1.

DETAILED DESCRIPTION

Figure 1:
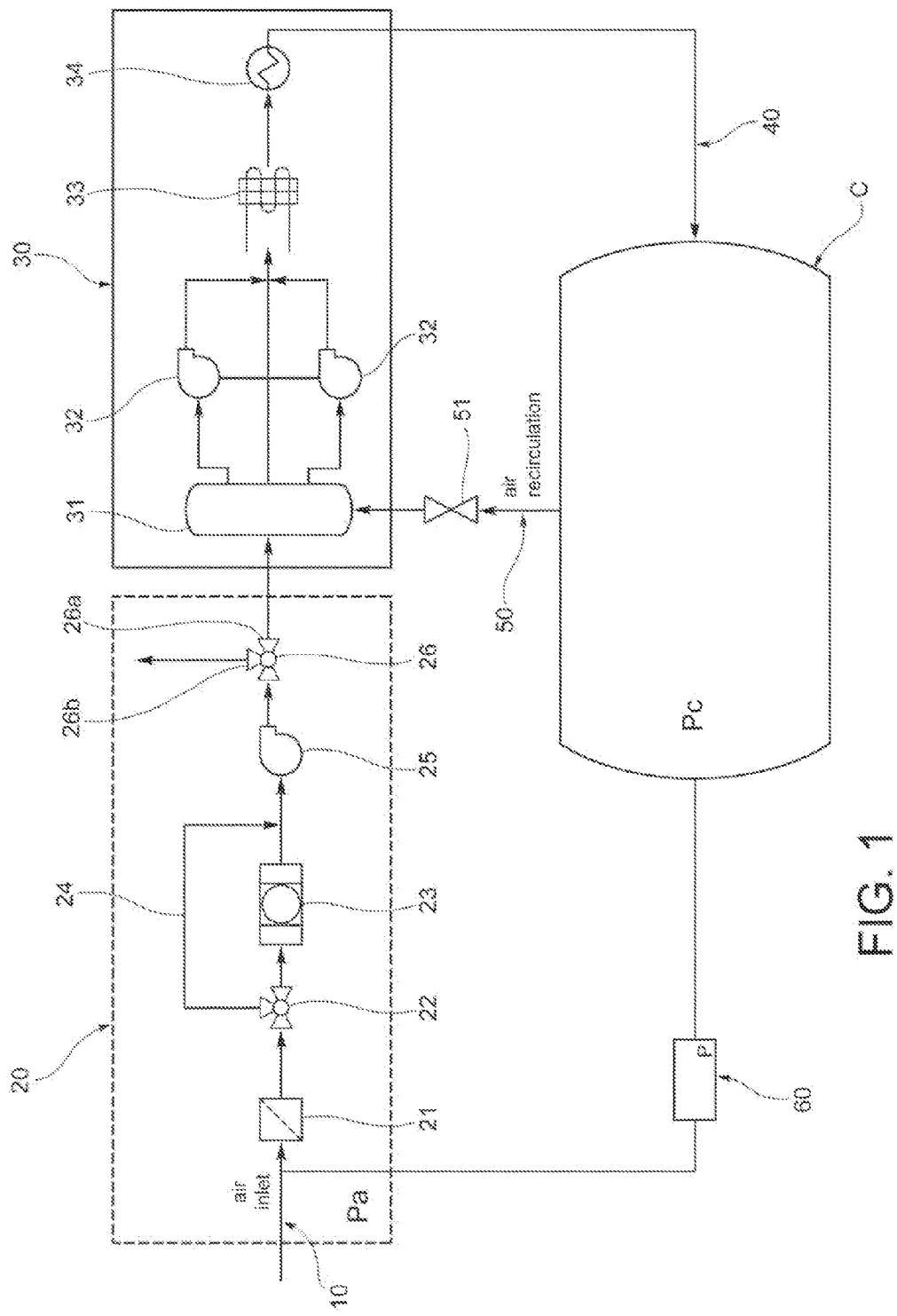
FIG. 1 shows, schematically, an embodiment of an air treatment apparatus for agricultural machines according to the invention.

FIG. 1 shows, schematically, a cab air treatment apparatus for agricultural machines according to the invention. The letter C indicates a cab of the agricultural machine, which, according to the regulations on exposure to hazardous substances, is required to be insulated from the external environment and pressurized with respect thereto (at least in the higher safety classes); in the drawing, Pc indicates the air pressure in the cab, while Pa represents the air pressure in the external environment.

The air treatment apparatus essentially comprises an external air inlet 10 through which air is drawn at a pressure Pa from the external environment, a filtration system 20 connected downstream of the external air inlet 10, an air conditioning system 30 connected downstream of the filtration system 20, and a cab air supply outlet 40 connected downstream of the air conditioning system 30, through which treated air is supplied to the cab C at a pressure Pc.

The filtration system 20 comprises, in sequence, a first filter 21, a bypass valve 22, a second filter 23 (for example, but not exclusively, an active carbon filter), which is associated with a bypass branch 24 arranged in parallel with it, a blower 25 and a deflecting valve 26.

The first filter 20 is adapted to provide a mechanical filtration of dust, and serves to prevent premature clogging of the second filter 23 when the latter is active.

The bypass valve 22 arranged upstream of the second filter 23 is adapted to selectively put the second filter 23, or a bypass branch 24 arranged in parallel with the second filter 23, in communication with the rest of the system. Thus the filtration action of the second filter 23 can be enabled or disabled in order to permit the rational use of this filter; in fact, the latter one can be excluded from the air treatment apparatus when its filtration action is not required.

The second filter 23 is a filter chosen from among known filters capable of suppressing:

i. Dust
ii. Dust+aerosols
iii. Dust+aerosols+vapours, according to the required safety class of the agricultural machine.

Owing to the presence of the bypass valve 22, the second filter 23 can be removed (for maintenance or replacement, for example) without completely compromising the functionality of the system. In this case, the system will provide a filtration function using only the first filter 21.

Preferably, the second filter 23 is associated with an installation monitoring system (not shown) capable of detecting whether the second filter 23 is or is not installed in the seat provided.

The second filter 23 is also associated with a system for monitoring the saturation level, which is described more fully below.

The blower 25 serves to compensate for the pressure drop due to the first filter 21, the second filter 23 and the lines associated with them, upstream of the blower 25, thus providing a desired pressurization downstream of the air supply outlet 40, and therefore in the cab C, so as to prevent the ingress of pollutants into the cab. Thus fresh air enters the cab through the filters 21 and 23 only, providing a purifying action.

The deflecting valve 26 has a main outlet 26a connected to the air conditioning system 30, and a discharge outlet 26b for cleaning the filtration system 20, said outlets being operable alternatively to one another. The outlet of the blower 25 is therefore put into communication through the deflecting valve 26 with the air conditioning system 30 or, alternatively, with the outside. The discharge outlet 26b therefore makes it possible to remove any pollutant remaining trapped in the system from upstream of the blower 25 to the valve 26 inclusive.

The air conditioning system 30 is of a conventional type; fresh and recycled air to be supplied to the cab C is dehumidified and brought to the desired temperature by means of this system. In a conventional way, the air conditioning system 30 may comprise an air mixing plenum 31, one or more blowers 32, an evaporator 33 and a heater 34.

The cab C is also connected to the air mixing plenum 31 of the air conditioning system 30 through an air recycling line 50, provided with a shut-off valve 51. This valve also has the function of forcing the flow of fresh air, which is subsequently supplied to the cab, to pass through the air conditioning system 30.

A differential pressure sensor 60 is also associated with the apparatus for the purpose of measuring the pressure difference Pc–Pa between the inside of the cab C and the external environment. This information is used to control the speed of the blower 25 to enable the cab pressurization to be controlled.

A system for monitoring the saturation level is also associated with the second filter 23, for the purpose of monitoring the saturation level of this filter. This system can be used to monitor the safety conditions of the operator and prevents incorrect use of the filter; it may comprise various devices, for example (see FIGS. 2a-2i and 2l-2n):

a timer 71 (FIG. 2f) for measuring a period of use of the filter;
one or more pressure sensors 72 (FIG. 2b) for measuring a pressure difference between the inlet and outlet of the filter 23;
one or more concentration meters 73 (FIG. 2c) for measuring a difference in the concentration of a substance in the air, between the inlet and outlet of the filter 23. This substance may be a pollutant, a component of the air, or a marker substance introduced into the air flow upstream of the filter by an injector 73a (FIG. 2d);
a temperature sensor 74 (FIG. 2e) for measuring a temperature of the filter 23. In fact, it is known that the adsorption of a substance is an exothermic reaction, and therefore the measurement of the temperature can enable the saturation level of the filter to be evaluated;
a colouring substance which changes colour according to the chemical conditions of the filter;
a circuit 75 for measuring the electrical conductivity of the filter 23 (FIG. 2n).

For greater reliability, the monitoring system may also comprise a combination of the aforesaid devices, for example:

a timer 71 and a pressure sensor 72 (FIG. 2a);
a timer 71 and concentration meters 73 (FIG. 2g);
a timer 71, concentration meters 73, and a marker substance injector 73a (FIG. 2g);
a timer 71 and a temperature sensor 74 (FIG. 2i);
a timer 71, a temperature sensor 74, concentration meters 73, and a marker substance injector 73a (FIG. 2l);
a timer 71 and a colouring substance which changes colour according to the chemical conditions of the filter;
a timer 71 and a circuit 75 for measuring the electrical conductivity (FIG. 2n).

Figure 3:
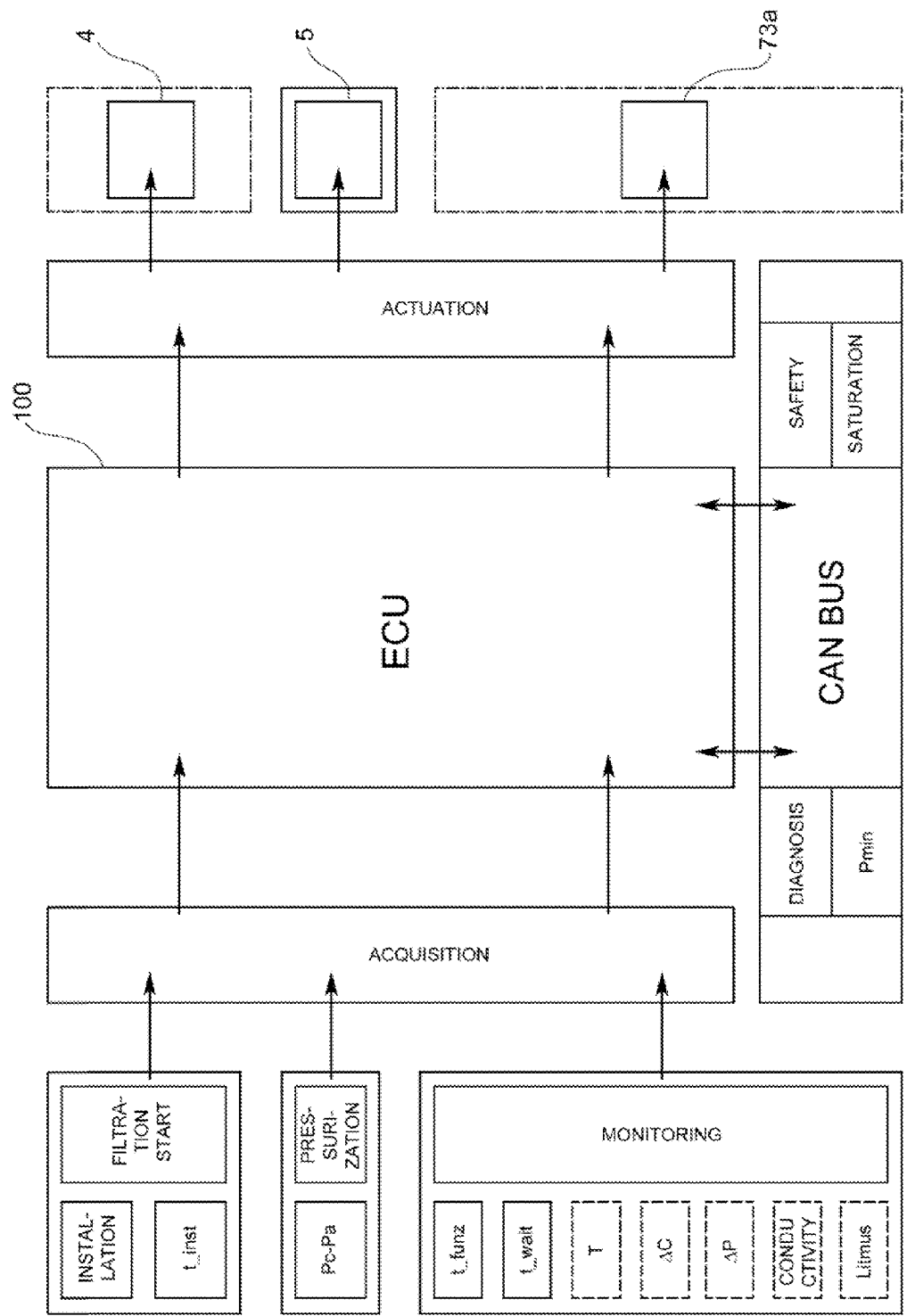
FIG. 3 is a schematic illustration of an architecture of an electronic control system of the apparatus of FIG. 1.

With reference to FIG. 3, the apparatus according to the invention is controlled by an electronic control unit 100.

A controllable function of this control unit 100 is the control of a "key inserted" condition. When the apparatus is started, the control unit 100 starts the cleaning and purification of components 21 to 26 of the filtration system. In this condition, the deflecting valve 26 is set to a position in which the air flow entering from the inlet 10 is discharged to the outside, and is thus not supplied to the air conditioning system and to the cab C. Thus the blower 25 impels the air towards the discharge outlet 26b of the valve 26 to clean components 21 to 26. This procedure is followed for a time interval determined on the basis of a mathematical model, measurements of the pollution level of the air (obtained from the system for monitoring the saturation of the filter 23), or both of these criteria.

The control unit 100 can thus detect the positioning of the filter 23 in its housing. An electrical device (not shown) is fitted on the filter, on the corresponding housing, or on both of these, to detect the presence of the filter 23. This arrangement enables the system to be set to different statuses, particularly a "filter ON" status and a "filter OFF" status.

The control unit 100 can also manage the pressurization control. The differential pressure sensor 60 measures the pressurization level Pc–Pa of the cab. This information is acquired from the control system that acts on the blower 25 to keep the pressurization at a safe level. For this purpose, the system is programmed on the basis of a mathematical model which allows for the measurements of pressure and of the operating characteristics of the components, particularly the blower, and implements a predetermined control strategy. The level of pressurization is displayed in the cab so that the operator can control it; if this level falls below a threshold value Pmin, an alarm signal is activated.

The control unit 100 can also control the system for monitoring the saturation level of the second filter 23. On the basis of a mathematical model, the control system receives the data from the monitoring system and informs the operator of the status of the filter. If this status is unsatisfactory, owing to an anomaly, or the end of the filter life cycle, or a loss of filtration capacity, an alarm signal is activated and/or displayed, and a safety strategy is executed.

In particular, the control unit 100 executes a monitoring method comprising at least one of:

a) measuring a period of use t_funz of the second filter 23 (by means of the timer 71), and comparing a measured value of the period of use with a threshold value of time associated with a predetermined saturation level of the filter,
b) measuring a difference between values of a physical quantity, respectively upstream and downstream of the second filter 23 (the pressure difference $\Delta P$ and/or the difference in concentration $\Delta C$ of a substance in the air), and comparing a measured value of this difference with a threshold value of difference associated with a predetermined saturation level of the filter, and
c) measuring a physical property (the temperature T or the electrical conductivity) of the second filter 23, and comparing a measured value of this physical property with a threshold value of the property associated with a predetermined saturation level of the filter.

The measurement of the period of use of the second filter 23 may comprise switching on time metering when the filter is in use, and switching off this time metering when the filter is in the rest condition. The control strategy can be implemented in such a way that the process of cleaning the filtration system is allowed for in the time metering.

If the control system provides for the measurement of the difference in concentration of a substance in the air, and if this substance is a marker substance suitably introduced by the injector device 73a, the control unit 100 also controls the injector device 73a which introduces this substance.

According to a further embodiment of the invention, the filtration system 20 of the apparatus according to the invention may comprise two separate air intake lines, each comprising the first filter 21, the bypass valve 22 and the second filter 23, and both leading to a single blower 25. By comparison with the preceding embodiment, this configuration has a longer operating period (when one of the filters 23 is spent, the other is generally still operational); furthermore, there is a small air flow to be treated by each pair of filters, and therefore greater filtration efficiency.

What is claimed is:

1. Cab air treatment apparatus for an agricultural machine, comprising an external air inlet, a filtration system connected downstream of the external air inlet, an air conditioning system connected downstream of the filtration system, and a cab air supply outlet connected downstream of the air conditioning system, wherein said filtration system comprises, in order:
   - a first filter for providing a mechanical filtration of dust,
   - a second filter for providing a filtration of at least one among dust, aerosols and vapours, upstream of which a bypass valve is arranged for selectively putting the second filter, or a bypass branch arranged in parallel with the second filter, in communication with the system,
   - a blower for providing a desired pressurization downstream of the cab air supply outlet), and
   - a deflecting valve having a main outlet connected to the air conditioning system, and a discharge outlet for cleaning the filtration system, said outlets being operable alternatively to one another.

2. Apparatus according to claim 1, further comprising a cab air recycling line connected to an inlet of the air conditioning system, downstream of the filtration system.

3. Apparatus according to claim 1, further comprising a differential pressure sensor for measuring a difference between a pressure downstream of the cab air supply outlet and the pressure of the external air.

* * * * *